C. E. MARKS.
ELECTRICAL REGULATOR.
APPLICATION FILED SEPT. 27, 1916.
1,306,854.
Patented June 17, 1919.
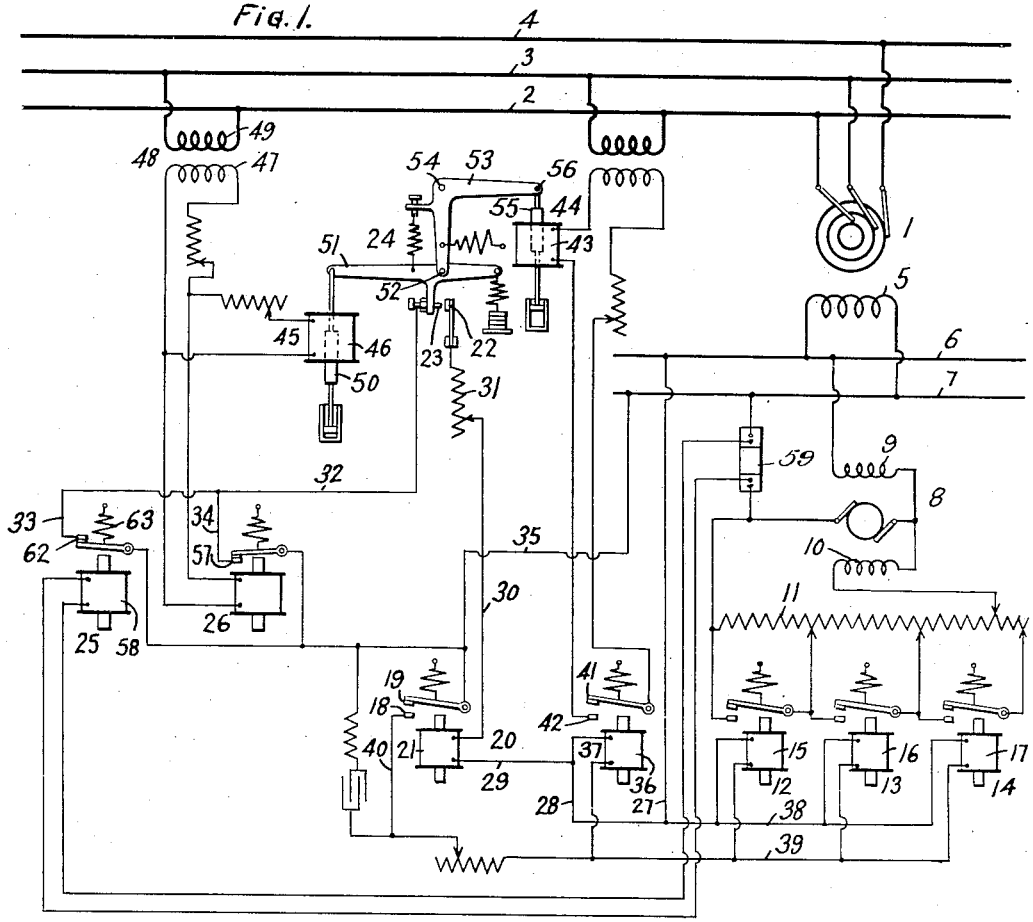
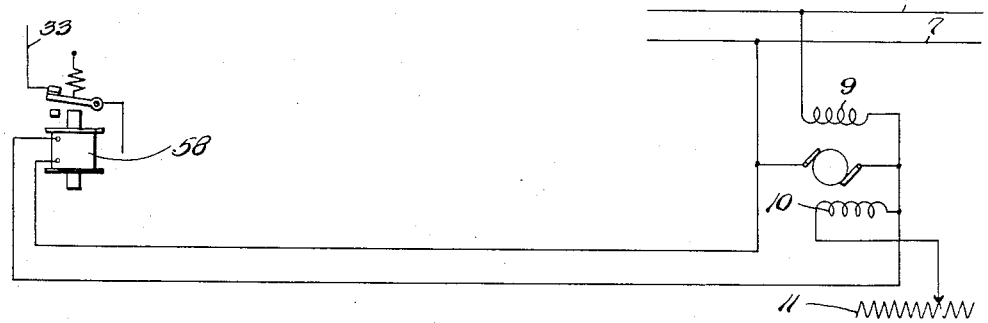
WITNESSES:
Fred H Miller
Geo. W. Hansen.
INVENTOR
Charles E. Marks
BY
Wesley G Carr
ATTORNEY

UNITED STATES PATENT OFFICE.

CHARLES E. MARKS, OF NEW YORK, N. Y., ASSIGNOR TO WESTINGHOUSE ELECTRIC & MANUFACTURING COMPANY, A CORPORATION OF PENNSYLVANIA.

ELECTRICAL REGULATOR.

1,306,854.  Specification of Letters Patent.  Patented June 17, 1919.

Application filed September 27, 1916. Serial No. 122,389.

*To all whom it may concern:*

Be it known that I, CHARLES E. MARKS, a citizen of the United States, and a resident of New York city, in the county of Bronx and State of New York, have invented a new and useful Improvement in Electrical Regulators, of which the following is a specification.

My invention relates to electrical regulators, and it has special reference to regulators of the vibratory-contact type that are employed for adjusting the field excitations of dynamo-electric machines.

More particularly, my invention refers to a regulator of the above indicated character that embodies protective means for limiting the field excitation of a generator when short-circuited for any appreciable length of time and the field excitation of which is ordinarily controlled by such a regulator in order to maintain a substantially constant impressed voltage.

When unduly heavy loads or short circuits obtain in a distributing system fed by a generator, the field excitation of which is controlled by an electrical regulator of the vibratory-contact type, the main contacts of the regulator will close to increase the field excitation and, therefore, to attempt to build up the voltage of the generator to its normal value. If the short-circuit or heavy overload upon the system persists for any appreciable time, the exciter supplying current to the field winding of the generator may build up the generator field to an extremely high value and, sometimes, to saturation. When the short circuit is cleared or the overload is discontinued, it is obvious that the voltage of the generator may rise to a dangerously high value before the regulator can respond to bring the voltage back to normal. The regulator can not promptly respond to the changed circuit conditions since the current flowing in the field winding of the exciter requires an appreciable time interval to decrease to its normal value. It is obvious that the only way in which the voltage of the generator, under these circumstances, can be prevented from rising to an abnormally high value is by reducing the field current of the generator before the generator is cleared of the short-circuit or heavy overload, and it is the object of the present invention to provide means for accomplishing the desired result.

In the accompanying drawing, Figure 1 is a diagrammatic representation of a distributing system fed by a generator having its voltage controlled by an electrical regulator and embodying one form of my invention, and Fig. 2 is a diagrammatic view of a portion of a modified system.

Referring to Fig. 1 of the drawing, an alternating current generator 1 is connected to main bus-bars or conductors 2, 3 and 4 of a distributing circuit. A field-magnet winding 5 is connected to exciter bus-bars 6 and 7 to which current is supplied by an exciter 8. The exciter is provided with a series field-magnet winding 9 and a shunt field-magnet winding 10 the latter having an adjustable resistor 11 connected in series therewith. The terminals of the resistor and suitable intermediate points thereof, are respectively connected to contact members of a plurality of vibrating contact relays 12, 13 and 14. The relays 12, 13 and 14 are adapted to operate in unison and, to this end, are provided with actuating windings 15, 16 and 17, respectively, that receive current from the exciter bus-bars 6 and 7 and the circuits of which are controlled by the stationary and movable contact members 18 and 19 of a master relay 20.

The relay 20 is provided with an actuating winding 21 that is excited from the direct-current bus-bars 6 and 7 when a stationary contact member 22 and a movable contact member 23 of a vibratory contact type regulator effect engagement and when contact members of protective relays 25 and 26 are in engagement as shown. In this circumstance, current flows from the bus-bar 6, over conductors 27, 28 and 29, through the actuating winding 21 of the master relay 20, over a conductor 30, an adjustable resistor 31, through the contact members 22 and 23 of the regulator 24, over a conductor 32, through two parallel branch circuits 33 and 34 and over a conductor 35 to the direct-current bus-bar 7.

On energizing the winding 21, the contact members 18 and 19 of the master relay 20 engage and, therefore, the actuating windings 15, 16 and 17 of the shunting relays 12, 13 and 14 and an actuating winding 36 of a relay 37 are connected in parallel circuit to the bus-bars 6 and 7, since conductors 38 and 39, that are common to the relays 12, 13, 14 and 37 are connected by means of the conductor 35, a circuit 40 comprising the contact members 18 and 19, and the conductor 27 to said bus-bars. The relays 12, 13, 14 and 37 are of the vibratory contact type, the relay 37, because, of the engagement and disengagement of its contact members 41 and 42, causing intermittent excitation of an actuating winding 43 of a vibrating electromagnet 44 of the main control element 24 of the regulator, while the remainder serve to vary the effective value of the resistor 11 in a manner well known in the art.

The main control element 24 also comprises a main control electromagnet 45, the actuating winding 46 of which is energized by means of a secondary winding 47 of the voltage transformer 48, the primary winding 49 thereof being connected across one phase 2—3 of the distributing system. The electromagnet 45 influences a plunger 50 that is attached to one end of a rocker arm 51. The rocker arm is pivoted at 52 to the lower end of the vertical arm of a bell-crank lever 53 which, in turn, is pivoted at 54. The vibrating electromagnet 44 influences a plunger 55 that is attached at 56 to the rocker arm 53. For a more detailed description of the control element 24, reference may be had to U. S. Patent No. 1,147,576.

The secondary winding 47 of the voltage transformer 48 also controls the excitation of the voltage relay 26 here shown as a vibrating contact relay, but which may be replaced by a voltmeter relay of the well known type which, in all respects, is the electrical equivalent of the relay illustrated. The voltage relay 26 is so constructed that its contact members 57 are in engagement as long as the voltage impressed upon the distributing conductors 2, 3 and 4 exceeds a predetermined value. Under these conditions, the branch circuit 34, which is connected in series with the circuit established through the contact members 22 and 23 of the regulator 24, is closed. Therefore, when the relay 26 is influenced by normal conditions and a circuit through the main contacts 22 and 23 of the regulator 24 is established, the master relay 20 serves to energize the windings of the relays controlling the effective value of the resistor 11.

The protective relay 25 is provided with an actuating winding 58 that is connected in closed circuit with a current shunt member 59. The member 59 is connected in series with the armature of the exciter 8. Under normal conditions, the excitation of the relay 58 is not sufficient to disengage the contact members 62 which are held in engagement under operating conditions by means of a spring element 63. The branch circuit 33, comprising the contact members 62 of the protective relay 25, is connected in parallel relationship with the branch circuit 34 and in series with the control circuit established through the contact members 22 and 23 of the regulator 24. When the current flowing from the exciter 8 exceeds a predetermined value, the relay 25 will be sufficiently energized to effect disengagement between the contact members 62. The branch circuit 33 is then interrupted.

If the branch circuit 33, which is controlled by the relay 25, is interrupted simultaneously with the branch circuit 34, controlled by the relay 26, the master relay 20 will be deënergized and, consequently, the relays 12, 13 and 14 will be rendered inactive thereby inserting the maximum value of the resistor 11 in circuit with the field winding 10 of the exciter 8. It will be noted that the control circuit exciting the actuating winding of the relays 12, 13, 14 and 37 is controlled by the two relays 25 and 26, the former being actuated when the exciter current exceeds a predetermined value and the latter being rendered inactive when the voltage of the supply circuit falls below a predetermined value. Both relays 25 and 26 must simultaneously open the branch circuits 33 and 34 in order to deënergize the control circuit that energizes the shunting relays associated with the resistor 11.

When the generator 1 is subjected to short-circuit conditions or the equivalent thereof, the voltage it impresses upon the distributing conductors 2, 3 and 4 will decrease below a predetermined value. The contact members 57 of the relay 26 will, as a result, disengage, but the main contact members 22 and 23 of the regulator 24 will close the main control circuit causing the exciter voltage and, consequently, the field current of the generator to increase in order to compensate for the decreased voltage of the generator 1. If the field current of the generator 1 exceeds a predetermined value, the relay 25 will disengage the contact members 62 thereby opening the main control circuit. As a result, the effective value of the resistor 11 reaches its maximum and the exciter voltage will consequently drop.

When the voltage of the exciter decreases below a predetermined value, or, in other words, when the exciter voltage drops below the amount required to force a predetermined field current to flow in the field winding 5 of the generator 1, the contact members 62 of the protective relay 58 will engage and, the exciter voltage will be increased since the relays 12, 13, 14 and 37 will perform their usual functions. If the current in the field winding 5 rises above a predetermined value, the relay 25 will open. In other words, the relay 25 will vibrate and perform some of the functions of the main control element 24 until such time as the voltage upon the mains 2, 3 and 4 rises to a sufficiently high value to close the relay 26. When the contact members of the relays 25 and 26 are in engagement, the main control element 24 will again assume its normal operation.

As the load upon the generator 1 increases, the field current supplied to the field winding 5 will increase and may exceed the predetermined value at which the relay 25 is actuated. The relay 25 may open the branch circuit 33 but the operation of the regulator 24 will not be affected unless the relay 26 is simultaneously actuated therewith which only occurs when a short circuit or an extremely heavy overload obtains in the distributing system.

While I have shown the relay 25 as being energized from a current-shunt member 59 that is connected in series with the armature of the exciter 8, it is obvious that, under certain conditions, the relay 25 may be connected across the terminals of the exciter, as is illustrated in Fig. 2. In this case, the relay will operate to open the circuit 33 when the exciter voltage increases above a predetermined value.

Again, I have shown my invention associated with a main control element 24 comprising two levers that control the engagement and disengagement of the main contact members 22 and 23, but it will be noted that my invention may be applied to any form of vibrating contact regulator that is employed in connection with a dynamo-electric machine and an exciter therefor to vary the field current supplied to the dynamo-electric machine.

While I have shown and described one embodiment of my invention, it will be readily understood that my protective means may be employed with regulators adapted to meet other requirements and to regulate in accordance with variations of any other electrical condition obtaining in a distributing system without departing from the spirit and scope of the appended claims.

I claim as my invention:

1. The combination with a dynamo-electric machine having a field winding, an exciter therefor, and a field winding for said exciter, of an electrical regulator for adjusting the excitation of the exciter field winding, and means for lowering the exciter voltage when the terminal voltage of said dynamo-electric machine decreases below a predetermined value simultaneously with an abnormal exciter-circuit condition.

2. The combination with a dynamo-electric machine having a field winding and an exciter therefor, of an electrical regulator for controlling the voltage of said exciter, and means for rendering said regulator inactive when an abnormal voltage of said dynamo-electric machine obtains simultaneously with an abnormal exciter-circuit condition.

3. The combination with a dynamo-electric machine, an exciter therefor having a field-magnet winding, and a resistor in circuit with said field-magnet winding, of an electrical regulator for controlling the effective value of said resistor, and means associated with said regulator for increasing the effective value of said resistor when the voltage of said dynamo-electric machine falls below a predetermined value simultaneously with an abnormal change in the condition of the exciter circuit.

4. The combination with a dynamo-electric machine, an exciter therefor having a field-magnet winding, and a resistor in circuit with said field-magnet winding, of an electrical regulator for controlling the effective value of said resistor, and means for increasing the effective value of said resistor to its maximum when the voltage of said dynamo-electric machine falls below a predetermined value simultaneously with an abnormal change in the condition of the exciter circuit.

5. The combination with a dynamo-electric machine, an exciter therefor having a field-magnet winding, and a resistor in circuit with said field-magnet winding, of an electrical regulator for controlling the effective value of said resistor, and means for increasing the effective value of said resistor to its maximum when the voltage of said dynamo-electric machine falls below a predetermined value simultaneously with an increase in the current flow from said exciter beyond a predetermined value.

6. The combination with a dynamo-electric machine having a field winding, and an exciter therefor, of an electrical regulator for controlling the voltage impressed on said field winding by the exciter, and means jointly controlled by exciter and machine-circuit conditions for decreasing the generated voltage of said exciter when the dynamo-electric machine is subjected to short-circuit conditions.

7. The combination with a dynamo-electric machine, an exciter therefor having a field-magnet winding, and a resistor in circuit with said field-magnet winding, of an electrical regulator for controlling the effective value of said resistor, and means controlled by exciter-circuit conditions for increasing the effective value of said resistor to its maximum when said dynamo-electric machine is subjected to short-circuit conditions.

8. The combination with a dynamo-electric machine having a field winding, and an exciter therefor, of an electrical regulator for controlling the excitation of said field winding, and means jointly controlled by exciter and machine-circuit conditions for automatically decreasing the excitation of said field winding to its minimum value when said dynamo-electric machine is subjected to short-circuit conditions.

9. The combination with a dynamo-electric machine, an exciter therefor, a field-magnet winding for the exciter, and a resistor in circuit therewith, of a regulator comprising coöperating contact members, a plurality of relays for controlling the effective value of said resistor and being actuated by a control circuit established through said contact members, and two protective relays connected in parallel with each other and in series with said control circuit and operated under different conditions for rendering said regulator inoperative when said dynamo-electric machine is subjected to short-circuit conditions.

10. The combination with a dynamo-electric machine, an exciter therefor, a field-magnet winding for the exciter, and a resistor in circuit therewith, of a regulator comprising coöperating contact members, a plurality of relays for controlling the effective value of said resistor and being actuated by a control circuit established through said contact members, and two protective relays connected in parallel with each other and in series with said control circuit for rendering said regulator inoperative, one of said relays opening one branch of said control circuit when the voltage of said dynamo-electric machine falls below a predetermined value and the other of said relays opening the remaining branch of said control circuit when the exciter is operated under abnormal conditions.

In testimony whereof, I have hereunto subscribed my name this 21 day of September 1916.

CHARLES E. MARKS.